Aug. 18, 1953  D. A. GRANT ET AL  2,648,942
MACHINE FOR CUTTING AND LOADING CORN AND LIKE CROPS
Filed May 28, 1949  2 Sheets-Sheet 1
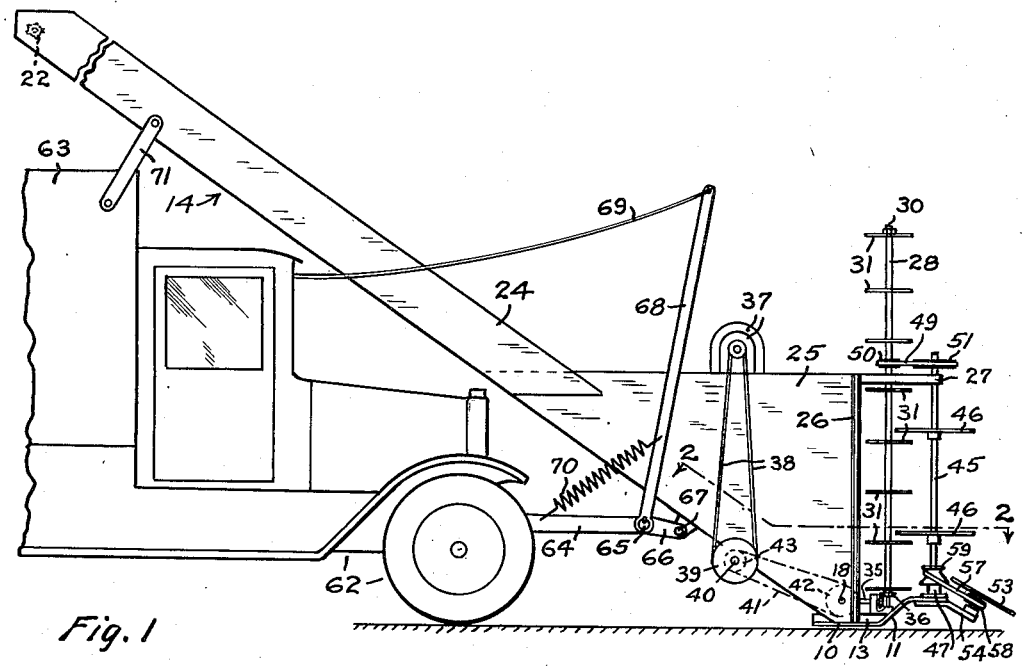
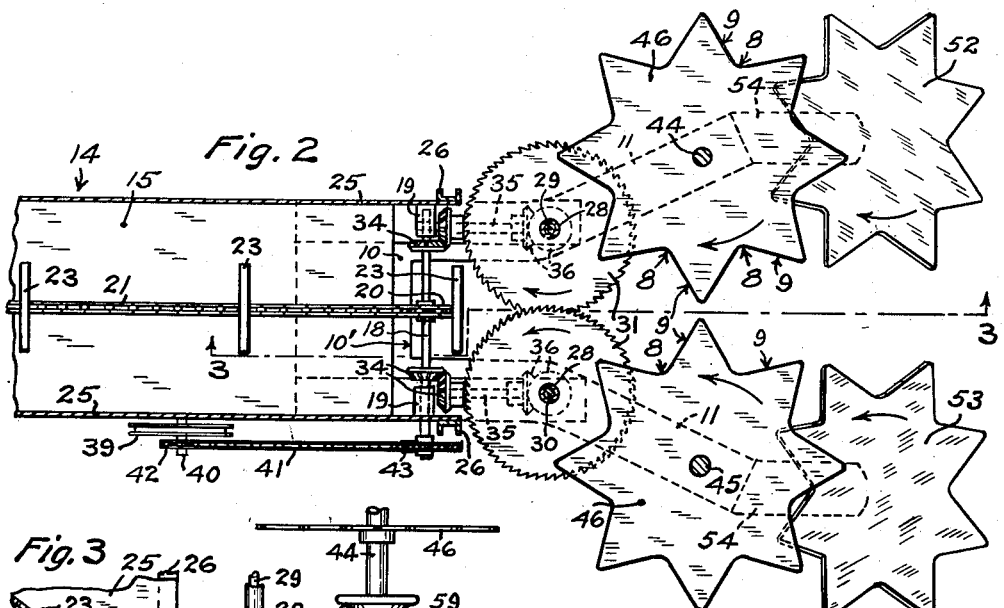
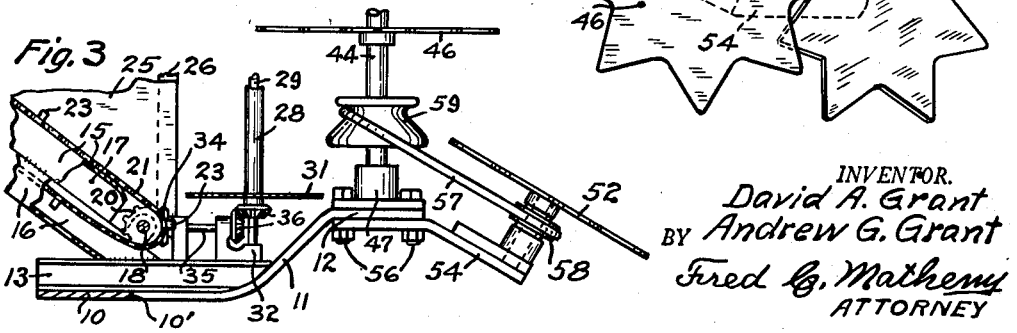
INVENTOR.
David A. Grant
BY Andrew G. Grant
Fred G. Matheny
ATTORNEY

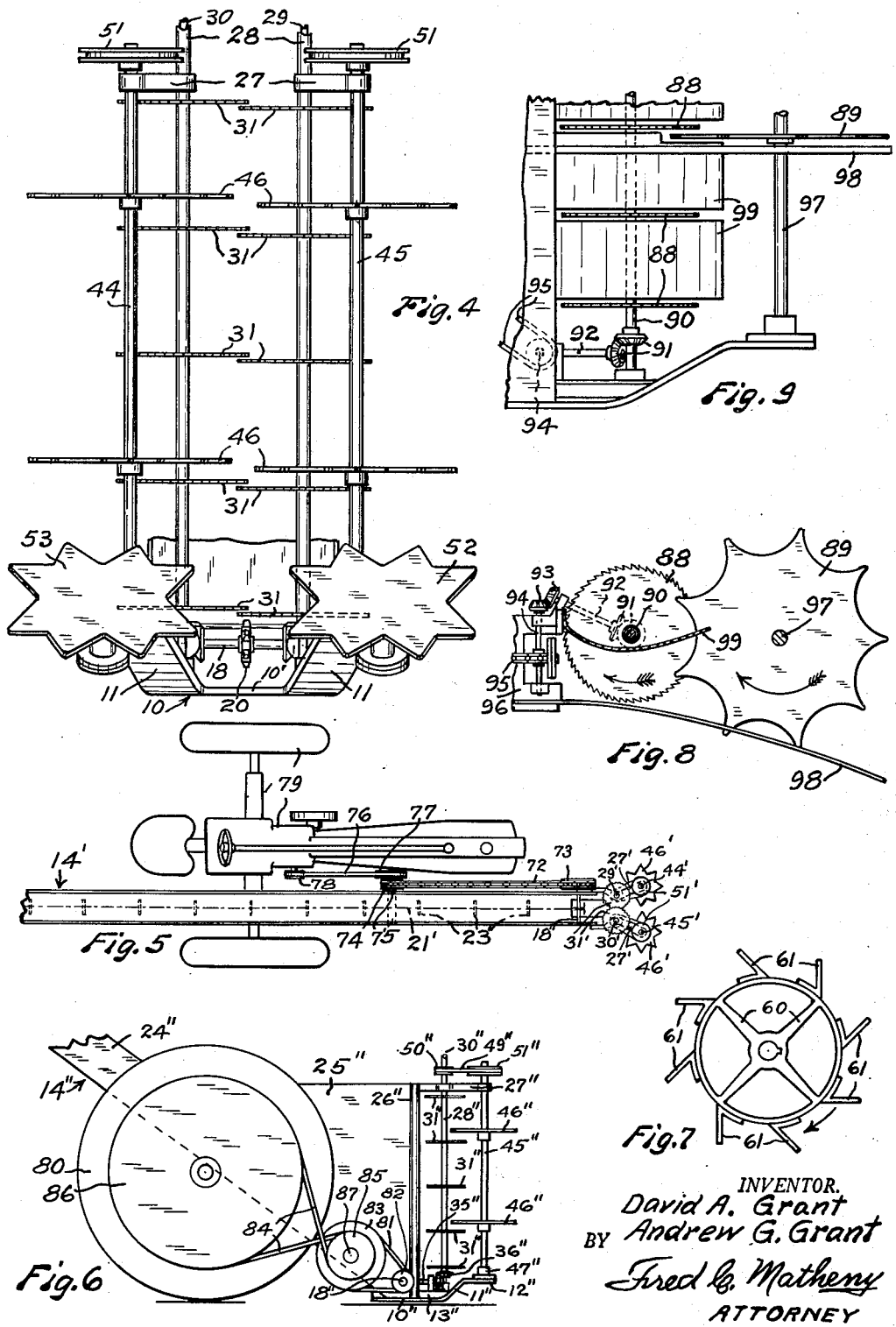

Patented Aug. 18, 1953

2,648,942

UNITED STATES PATENT OFFICE 2,648,942

MACHINE FOR CUTTING AND LOADING CORN AND LIKE CROPS

David A. Grant, Seattle, Wash., and Andrew G. Grant, New York, N. Y., assignors to Andrew G. Grant, David A. Grant, Connie Grant, and Thos. Marshall, as trustees of David H. Grant, deceased Application May 28, 1949, Serial No. 95,924

3 Claims. (Cl. 56—16)

This invention relates to a corn cutter and loader and the present invention is in the nature of an improvement on the corn cutter and loader disclosed in Patent No. 2,269,530, issued January 13, 1942, to David H. Grant.

A general object of this invention is to provide a highly efficient inexpensive light weight machine adapted to harvest green corn or a similar row crop, cut the same into pieces which are short enough to be handled readily and load the same into a rack or conveyance by which it can be hauled to an ensilage cutter where the cutting up of the green crop can be completed preparatory to putting it into a silo.

This machine is herein referred to as a corn cutter and loader but it will be understood that the same is equally well adapted for handling cane or substantially any other tall row crop which can be used for ensilage.

This machine is not intended to cut up the corn or other crop fine enough in the field, for ensilage, but only cuts the stalks up short enough so that they may be easily and economically handled. This makes the cut up crop easier to load in a rack, makes it possible to put larger loads on the vehicle on which it is handled, makes the corn or like crop easier to handle at the silo or ensilage cutter, and makes it possible to feed the corn or like crop faster and more evenly to the ensilage cutter. Machines which cut up the corn or other crop fine enough for ensilage purposes, at the time this crop is harvested in the field are necessarily relatively large and heavy and require much power to operate them and move them around in the field. This machine only cuts the crop up in short enough pieces to make it convenient and economical to handle and for this reason, can be relatively light and does not require much power to operate and thus, in field operation, effects a saving of many horsepower.

Another object of this invention is to provide a cutter and loader for row crops, such as corn, which has gathering means of novel and efficient construction for gathering in the stalks of vegatation and feeding them to rotating circular toothed knives by which the said stalks are cut up into pieces short enough so that the stalks of vegetation thus cut up will load compactly into a rack and are relatively easy to handle in unloading.

Another object is to provide a cutter and loader of this type which is light enough in weight so that it can be attached to and carried on either a truck or a tractor for operation in the field in cutting row crops.

Another object of this invention is to provide a cutter and loader of this type in which the cut up vegetation is delivered from the cutting means into a rearwardly extending elevator by which it is elevated into a rack without changing the direction of movement of the vegetation as it passes through the machine.

Another object of this invention is to provide a cutter and loader of this type which can be used as an attachment on a truck or tractor and which can be used to open up or make the first cut through a field without damaging or breaking down the corn or like vegetation in rows adjacent to the first row which is being cut.

Other objects of this invention are to provide a cutter and loader for corn or the like which is simple in construction, light in weight, not expensive to manufacture and which is highly efficient in operation.

When a tall crop, like corn, from which ensilage is to be made, is cut off near the ground and loaded into a rack without cutting the stalks up it is bulky and is very difficult to unload and feed to an ensilage cutter. To overcome this difficulty machines have been made for harvesting the silage crop and cutting it up into ensilage in the field. These machines are very heavy and cumbersome and require a great amount of power to move them around in the field. Our present machine only cuts the silage crop up in the field enough to make the cut up crop compact and easy to unload and feed to an ensilage cutter, and such a machine can be relatively light and not expensive to manufacture and can be carried on a truck or tractor in the field and can be operated by a small power unit or by a power take-off from the truck or tractor on which it is carried.

In practice it has been found that our machine, in order to properly condition the crop for economical loading and handling, only needs to do about one-fiftieth of the cutting which is required to make the crop ensilage. For this reason our machine can be many times lighter in weight than machines which make the ensilage in the field and the horse power required for hauling the heavier machines around in the field is saved by the use of our machine.

Other objects of this invention will be apparent from the following description and accompanying drawings.

In the drawings

Figure 1 is a view in side elevation of a corn cutter and loader constructed in accordance with this invention showing the same mounted on the forward end portion of a truck and arranged to deliver cut vegetation into a rack carried by the truck.

Fig. 2 is a view partly in plan and partly in cross section, taken substantially on broken line 2—2 of Fig. 1, and on a larger scale than Fig. 1 showing gathering and cutting and elevating means and parts of the driving means, parts being broken away.

Fig. 3 is a fragmentary view partly in section and partly in elevation, on a smaller scale than Fig. 2, and taken substantially on broken line 3—3 of Fig. 2.

Fig. 4 is a front elevation, on a larger scale than Fig. 1, parts being broken away and parts being omitted.

Fig. 5 is a somewhat diagrammatic fragmentary plan view on a small scale showing this cutter and loader connected with a farm tractor in such a manner as to be propelled and driven by the tractor, some of the gathering members being detached.

Fig. 6 is a side elevation showing a type of this corn cutter and loader which is equipped with wheels by which said corn cutter and loader is supported for movement and is driven, some of the gathering members being detached.

Fig. 7 is a detached plan view showing a modified form of gathering member which may be used in this machine.

Fig. 8 is a fragmentary plan view, with parts in horizontal section, of a modified form of corn cutter constructed in accordance with this invention in which only one cutting unit and one gathering unit is used.

Fig. 9 is a fragmentary side elevation of the corn cutting device shown in Fig. 8.

Like reference numerals designate like parts throughout the several views.

This machine for gathering, cutting and loading row crops comprises a forked base frame having a normally horizontal rear end portion 10, two upwardly inclined arm portions 11 and two other horizontal portions 12 integral with the upper end portions of said inclined arm portions 11. The rear frame portion 10 is rigidly secured to preferably two spaced apart horizontal frame members 13 and the frame members 13 serve as supports for the lower end portion of an elevator, designated generally by 14.

Preferably the main frame for the elevator 14 comprises two channel shaped members 15 and 16 welded or otherwise rigidly secured together with their channel sides face to face to form therebetween a rectangular passageway 17. The lowermost end portion of the elevator member 16, see Fig. 3, is welded or otherwise rigidly secured to the two spaced apart frame members 13. A shaft 18 journaled in bearings 19 extends crosswise of the lower end portion of the elevator 14 and a sprocket wheel 20 is secured to this shaft 18 medially of the elevator. An endless link belt 21 is operatively disposed on the sprocket wheel 20 and on another sprocket wheel 22, see dotted lines Fig. 1, positioned near the upper end of the elevator 14. This link belt 21 is provided with cross slats 23. The upper lap of the link belt 21 rides on the upper surface of the channel member 15 and is adapted to move upwardly along the same. The lower lap of the link belt 21 is adapted to move downwardly through the passageway 17 between the two channel members 15 and 16. The passageway 17 thus serves as a return passageway for the link belt 21 and cross slats 23.

The rear frame portion 10 serves as a cross tie between the frame members 13 and the forward edge 10' of said frame portion 10 is positioned to the rear of the path followed by the cross slats 23 as they travel around the sprocket wheel 20. This minimizes the danger of trash doubling over and collecting on said edge portion 10'.

Spaced apart side plates 24 of nominal height are provided on the upper end portion of the elevator 14 and preferably two relatively high spaced apart triangularly shaped side plates 25 are provided on the lower end portion of the elevator at the location where cut vegetation is delivered into said elevator.

Two spaced apart upright frame members 26 are secured to the horizontal frame members 13 and the forward edge portion of the triangular side plates 25 are secured to these two upright frame members 26. Horizontal frame members 27 extend forwardly from the upper end portions of the upright frame members 26 to support bearings, as hereinafter described.

Two spaced apart knife carrying shafts 29 and 30 are provided in front of the elevator 14 and a plurality of toothed circular cutting knives 31 are secured at spaced apart intervals to these shafts 29 and 30. Spacer tubes or sleeves 28 can be used on the shafts 29 and 30 to space the circular knives 31 apart and to secure said knives 31 to the respective shafts, or said circular knives 31 can be secured to the shafts 29 and 30 in other ways.

The circular knives 31 are arranged in pairs on the two shafts 29 and 30 with the knife on one shaft slightly offset relative to the knife of the same pair on the other shaft, see Fig. 4, and with the toothed peripheral portions of the knives 31 of each pair slightly overlapped at the location where the cutting is done. The lowermost pair of circular knives 31 is positioned near the ground to cut off the stalks of vegetation and the other pairs of knives 31 are spaced at desired intervals depending on the length of the pieces into which the vegetation is to be cut. The lower end portions of the shafts 29 and 30 are journaled in bearings 32 which may be carried by the frame members 13. The upper end portions of these shafts 29 and 30 may be journaled in suitable bearings carried by the upper horizontal frame members 27. The circular toothed knives 31 are driven in the direction indicated by the arrows in Fig. 2 so that they will cut up vegetation entering therebetween and direct it back into the elevator 14. The shafts 29 and 30 may be driven from the shaft 18 by pairs of bevel gears 34, short shafts 35 and other pairs of bevel gears 36, all arranged as best shown in Fig. 2, to impart rotation to the two shafts 29 and 30 in opposite directions. The shaft 18 may be driven from a combined internal combustion engine and power transmission unit 37 by a V belt 38 which engages with a sheave 39 on a bearing post 40 and a link belt 41 which extends around one sprocket wheel 43 which is rigid with the sheave 39 and around another sprocket wheel 42 which is secured to said shaft 18. Obviously the shaft 18 may be driven in other ways.

The means for gathering in the vegetation and delivering it to the circular knives 31 comprises two upright spaced apart gathering shafts 44 and 45 positioned forwardly of the knife carrying shafts 29 and 30. Preferably two or more pairs of rotary gathering members 46 are secured on the shafts 44 and 45. Preferably each gathering member is in the form of a star wheel of substantially the shape shown in Fig. 2, which is cut from a disc of metal. Preferably the star shaped gathering members 46 are of larger diameter than the knives 31 and preferably the shafts 44 and 45 are spaced far enough apart so that the path of the points of the star shaped gathering members 46 are closely adjacent to each other at their nearest location but do not overlap. A bearing 47 is provided at the lower end of each shaft 44 and 45 on which the star shaped gathering members 46 are carried and the upper end portion of each shaft 44 and 45 is rotatively supported in a suitable bearing in one of the horizontal frame pieces 27.

The shafts 44 and 45 which carry the gathering members 46 are driven from the knife carrying shafts 29 and 30 respectively, and in the same direction as the respective knife carrying shafts 29 and 30, by V belts 49. The V belts 49 are operatively disposed on smaller sheaves 50 on the knife carrying shafts 29 and 30 and larger sheaves 51 on the gathering shafts 44 and 45.

This provides means for driving the star shaped gathering members 46 at a slower speed than the cutting knives 31. This disclosure shows two star shaped gathering wheels 46 on each shaft 44 and 45. This number has been found satisfactory for harvesting relatively short corn or like vegetation but obviously any number of pairs of the star shaped gathering members and any number of pairs of knives 31 can be used, depending on the heighth of the vegetation being harvested. For corn or like vegetation which stands up fairly straight in the row the star shaped gathering members on the shafts 44 and 45 are all that are needed to gather in the vegetation and deliver it to the circular knives 31. However for corn or like vegetation which leans over badly or is "down" it may be desirable to use auxiliary gathering means to pick up the "down" stalks of vegetation and deliver them to the star shaped gathering members 46. This auxiliary gathering equipment may be in the form of two auxiliary star shaped gathering members 52 and 53 disposed forwardly and outwardly from the gathering shafts 44 and 45 and positioned at an incline, as shown in Figs. 1 to 4 inclusive, with their forward portions close to the ground.

The auxiliary gathering members 52 and 53 are rotatively supported by brackets 54. Preferably the brackets 54 are detachably secured to the base frame parts 12, see Fig. 3, as by bolts 56. These brackets 54 and the auxiliary gathering members 52 and 53 carried thereby can be quickly and easily attached to or detached from the machine. Each auxiliary gathering member 52 and 53 can be driven by a belt 57 which extends around a sheave 58 secured to the auxiliary gathering member and around a cone shaped pulley 59 secured to the shaft 44 or 45 on the same side of the machine as the auxiliary gathering member with which it is connected. This provides for driving the auxiliary gathering members in the correct directions.

Obviously the speed at which the auxiliary gathering members 52 and 53 are driven will be determined by the relative size of the sheaves 58 and cone shaped pulleys 59 and preferably the auxiliary gathering members 52 and 53 are driven at a faster speed than are the gathering members 46. The auxiliary gathering members 52 and 53 are spaced farther apart than are the gathering members 46 and said auxiliary gathering members are inclined so that their forward portions are close to the ground. This enables the auxiliary gathering members to get under the stalks of vegetation which are leaning over and are near the ground and to lift up these "down" stalks and feed them back to the gathering members 46. Preferably the peripheral speed of all of the gathering members 46, 52 and 53 is greater than the ground speed of the machine.

It is desirable to make the gathering members of star shape and it has been found that gathering members having eight points of substantially the shape shown in the drawings, will operate successfully. The stalks of vegetation are received in the spaces between the points of the gathering members and these spaces form shallow pockets so that the stalks of leaning over vegetation received in the recesses between the points will be straightened up as these stalks are fed back to the knives. This straightening up of the leaning stalks of vegetation is thus better accomplished by having the pockets in the periphery of the gathering members of shallow depth since even the stalks which are received in the bottom or vertex portions 8 of these gathering members are straightened up and the work of the circular cutting knives is accomplished in a better way if the stalks of vegetation are delivered to them in an upright position. Also the surface or edge portion 9 of each star point which engage with the stalks of vegetation should not be radial as respects the gathering member but should be non-radial, as shown, so that there will be no tendency for this stalk engaging surface to carry the stalk on around with it but each stalk will be released by the gathering members when the stalk contacts the rotary knives.

Obviously the form of these gathering members can be changed and still retain the desirable features arising from the shallowness of the pockets between the points of said gathering members and the incline of the surfaces by which the stalks of vegetation are engaged. For instance each gathering member can be in the form of a wheel 60 as shown in Fig. 7, with outwardly protruding inclined non-radial fingers 61. The circumferential portion of the wheel 60 helps to straighten up leaning stalks of vegetation and the inclined fingers 61 function in the same manner as the inclined edges 9 of the gathering members 46 to push these stalks rearwardly toward the circular knives and to release the stalks when the stalks are engaged by the circular knives. The inclined of these fingers 61 enables them to release the stalks of vegetation to the knives and insures that these stalks will not be carried around as they might be if the fingers were radial or more nearly radial.

Obviously the gathering members 46 are reversible and interchangeable and can not be wrongly applied to the shafts. The gathering wheels 60 must be positioned on their shafts so that the sides of the fingers 61, which form an obtuse rather than an acute angle with the adjacent peripheral surface of the wheel 60, will engage and press against the stalks. When this is done the fingers 61 will tend to release the stalks of vegetation as they pass the cutting knives and will not tend to hook around said stalks.

One way to support this corn cutter and loader on the front end portion of a truck 62 so that it may be used for cutting green corn or the like and elevating the product thus cut into a rack 63 on the truck is shown in Fig. 1. In accordance with the showing in Fig. 1, preferably two supports 64 are rigidly secured to the truck 62 so that they will extend forwardly from the front end of the truck a short distance above the ground. A shaft 65 is journaled in the forward end portions of the supports 64 and extends crosswise of the front end portion of the truck. Preferably two lever arms 66 are secured to the shaft 65 and extend forwardly therefrom and have their forward end portions connected by pivot means 67 with the elevator portion 14 of the corn cutter and loader. Also an upright lever arm 68 is rigidly secured to the shaft 65 and a cable 69 is secured to the upper end portion of the lever arm 68 and extends into the cab of the truck where it may be easily controlled by the driver of the truck.

Obviously this cable may be attached to any suitable adjusting means or fastened in any suitable way within the cab of the truck. Preferably a tension spring 70 is connected with the lever arm 68 to counterbalance the weight of the forward end portion of the machine and make it easy to raise the same. Also the spring 70 counterbalances the weight of the forward end portion of the machine so that this forward end portion will skim over the ground lightly and will not have a tendency to dig into the ground. The upper end portion of the elevator can be connected with the bed or rack portion 63 of the truck by link means 71. This provides a support for the corn cutter and loader and makes it possible to raise and lower the front end portion of the same.

Fig. 5 shows this corn cutter and loader attached to a tractor 79 of well known form in such a manner as to deliver cut corn or like green vegetation into a trailer which may be pulled behind the tractor. In Fig. 5 the corn cutter and loader parts indicated by numerals 14', 18', 21', 23', 27', 29', 30', 44', 45', 46' and 51' are the same as the respective parts 14, 18, 21, 23, 27, 29, 30, 44, 45, 46, and 51 shown in Figs. 1 to 4 and previously described. Also in said Fig. 5 the cutter and loader is secured to the tractor frame and carried by the tractor and the shaft 18' of the corn cutter and loader has a suitable driving connection with a power take-off of the tractor. This driving connection may be in the nature of an endless link belt 72 which extends around one sprocket wheel 73 on the shaft 18 and another sprocket wheel 74 on a countershaft 75. The countershaft 75 may be driven by a belt 76 which extends around a sheave 77 on said countershaft 75 and around a power take-off sheave 78 on the tractor 79.

Fig. 6 shows an adaptation of this invention in which the corn cutter and loader is supported on wheels 80. The corn cutter and loader parts indicated by numerals 10", 11", 12", 13", 14", 18", 24", 25", 26", 27", 28", 30", 31", 36", 45", 46", 47", 49", 50", and 51" in Fig. 6 are the same as the respective parts 10, 11, 12, 13, 14, 18, 24, 25, 26, 27, 28, 30, 31, 36, 45, 46, 47, 49, 50, and 51 shown in Figs. 1 to 4 and previously described. In said Fig. 6 the shaft 18" of the corn cutter and loader is driven from these wheels 80 by a V belt 81 extending around sheaves 82 and 83 and another V belt 84 extending around sheaves 85 and 86. The sheave 86 is a large sheave directly connected with the wheels 80. The sheaves 83 and 85 are rigidly connected with each other and are mounted on a countershaft 87. This provides for supporting this corn cutter and loader on its own wheels and provides driving means which synchronizes the ground speed of the machine with the speed of the driven parts of the same.

We claim:

1. In a machine for harvesting tall row crops, two upright knife carrying shafts positioned in side by side spaced apart relation and adapted to be moved along a crop row with one shaft on each side of the row; a plurality of pairs of circular toothed knives secured to said two knife carrying shafts with the two knives of each pair slightly offset vertically relative to each other and with circumferential parts of the knives between the two shafts disposed in slightly overlapped relation; driving means connected with said two knife carrying shafts rotatively driving the shafts and the knives in opposite direction to cut tall vegetation in a row as the machine is moved along the row; two upright gathering shafts positioned forwardly of said upright knife carrying shafts and substantially parallel therewith; a plurality of pairs of relatively flat horizontal gathering members on said gathering shafts, each gathering member having substantially triangularly shaped points on the peripheral portion thereof; and shaft driving means connected with said gathering shafts rotating the same in opposite directions, whereby adjacent portions of said gathering members are moved in the same direction and toward the cutting means to engage with and straighten up and feed rearwardly to said cutting members vegetation in a row between said gathering members.

2. In a machine for harvesting tall row crops, a frame, two upright knife carrying shafts supported by said frame in side by side spaced apart relation, and adapted to be moved along a crop row with one shaft on each side of the row; a plurality of pairs of circular toothed knives secured to said two knife carrying shafts with the pairs of knives vertically spaced apart and with the two knives of each pair slightly offset vertically and slightly overlapped at a location directly between the two shafts; elevator and loader means positioned rearwardly of said two knife carrying shafts adapted to receive cut up vegetation which has passed said knives; means driving said elevator and loader means and said knife carrying shafts, whereby said shafts and knives are oppositely rotated and the overlapping portions of said knives are moved toward said elevator means; two upright gathering shafts positioned forwardly of said knife carrying shafts; means rotatively driving said gathering member shafts in opposite directions with the adjacent peripheral portions of the gathering member shafts moving toward said knives; and a plurality of pairs of relatively flat gathering discs secured to said gathering shafts, with the pairs of gathering discs vertically spaced apart and the two discs of each pair substantially transversely opposite to each other, each gathering member having a plurality of outwardly protruding peripheral crop engaging arms adapted to engage with and straighten up stalks of crop in a row and urge the same toward said knives.

3. In a machine for harvesting tall row crops, crop cutting means adapted to be moved along a row of crop to cut the same; a pair of relatively flat substantially horizontal oppositely driven substantially star shaped gathering members mounted forwardly of said crop cutting means with their adjacent peripheral portion close to each other and moving toward said cutting means; and another pair of relatively flat oppositely driven inclined gathering members positioned below and forwardly of said first named gathering members, and inclined with their front edge portions lower than their rear edge portions and having their adjacent peripheral portions moving toward said cutting means, whereby down vegetation in a row along which the machine is moving will be picked up by said foremost inclined gathering members and transferred to said horizontal gathering members and will be held upright and urged toward said cutting means by said horizontal gathering members.

DAVID A. GRANT.
         ANDREW G. GRANT.

References Cited in the file of this patent

UNITED STATES PATENTS

| Number | Name | Date |
|---|---|---|
| 17,223 | Kellogg | May 5, 1857 |
| 1,323,498 | Scranton | Dec. 2, 1919 |
| 1,942,037 | Pierson | Jan. 2, 1934 |
| 1,964,579 | Hyman | June 26, 1934 |
| 2,133,217 | Thornton | Oct. 11, 1938 |

FOREIGN PATENTS

| Number | Country | Date |
|---|---|---|
| 408,250 | Great Britain | Apr. 4, 1934 |